United States Patent
Birch et al.

(10) Patent No.: US 12,106,556 B1
(45) Date of Patent: Oct. 1, 2024

(54) TASK-SPECIFIC SENSOR OPTICAL DESIGNS

(71) Applicant: National Technology & Engineering Solutions of Sandia, LLC, Albuquerque, NM (US)

(72) Inventors: Gabriel Carlisle Birch, Albuquerque, NM (US); Brian John Redman, Albuquerque, NM (US); Charles Fredrick LaCasse, IV, Albuquerque, NM (US); Amber Lynn Dagel, Lafayette, CO (US); Meghan Anne Sahakian, Albuquerque, NM (US); Bryan James Kaehr, Albuquerque, NM (US); Tu-Thach Quach, Albuquerque, NM (US); Daniel Alvaro Calzada, Albuquerque, NM (US); Bryana Lynn Woo, Albuquerque, NM (US); Jaclynn Javonna Stubbs, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 196 days.

(21) Appl. No.: 17/712,316

(22) Filed: Apr. 4, 2022

(51) Int. Cl.
*G06V 10/00* (2022.01)
*G06V 10/147* (2022.01)
(Continued)

(52) U.S. Cl.
CPC ............ *G06V 10/82* (2022.01); *G06V 10/147* (2022.01); *G06V 10/30* (2022.01); *G06V 10/765* (2022.01); *G06V 10/766* (2022.01); *G06V 10/478* (2022.01)

(58) Field of Classification Search
CPC ........ G06N 20/00; G06N 20/10; G06N 20/20; G06N 3/08; G06N 3/02; G06N 3/042;
(Continued)

(56) References Cited

U.S. PATENT DOCUMENTS 6,944,602 B2 * 9/2005 Cristianini ............. G06N 20/00
706/14
7,821,502 B2 * 10/2010 Hristov ............... G06F 3/04186
345/173

(Continued)

OTHER PUBLICATIONS

Candès, E. J. et al., "Compressive sampling," Proceedings of the international congress of mathematicians 3, 1433-1452 (2006).
(Continued)

*Primary Examiner* — Amir Alavi
(74) *Attorney, Agent, or Firm* — Daniel J. Jenkins

(57) ABSTRACT

A method and system architecture for designing a compressive sensing matrix for machine learning includes receiving an image associated with a classification task and; generating a sensing matrix. The sensing matrix includes an array of nonzero elements of the image. A prism array of prism elements is in communication with the sensing matrix. A row of values corresponding with an input angle of the prism array is mapped to a respective column corresponding with a detector. Then the detector detects light refracted at an output angle dictated by the physical shape of the prism element. A physical model of the detector is fabricated and generates a compressed representation of the image. A machine learning classification algorithm is applied to the compressed representation of the image and generates an optimized non-invertible final determination of the image.

26 Claims, 7 Drawing Sheets

(51) Int. Cl.
| | |
|---|---|
| G06V 10/30 | (2022.01) |
| G06V 10/764 | (2022.01) |
| G06V 10/766 | (2022.01) |
| G06V 10/82 | (2022.01) |
| G06V 10/46 | (2022.01) |

(58) Field of Classification Search
CPC .......... G06N 3/045; G06N 3/47; G06N 3/049; G06N 3/082; G06N 3/092; G06N 3/0454; G06N 3/0475; G06N 3/0464; G06V 10/82; G06V 10/765; G06V 10/30; G06V 10/478; G06V 10/147; G06V 10/766
See application file for complete search history.

(56) References Cited

U.S. PATENT DOCUMENTS

| | | | | |
|---|---|---|---|---|
| 10,387,751 | B2* | 8/2019 | Braun | G06N 3/047 |
| 10,529,079 | B2* | 1/2020 | Kwan | G06F 18/2136 |
| 10,671,068 | B1* | 6/2020 | Xu | G06N 20/10 |
| 10,898,928 | B2* | 1/2021 | Chaganti | G06V 10/457 |
| 10,973,486 | B2* | 4/2021 | Sjöstrand | A61K 51/0478 |
| 11,461,690 | B2* | 10/2022 | Szeto | G06N 20/10 |
| 11,475,072 | B2* | 10/2022 | Mueller | G06N 20/10 |
| 11,526,737 | B2* | 12/2022 | Khoury | G06F 17/16 |
| 11,934,932 | B1* | 3/2024 | Gambardella | G06F 11/16 |
| 2018/0197046 | A1* | 7/2018 | Braun | G06N 3/047 |

OTHER PUBLICATIONS

Davenport, M. A., Duarte, M. F., Wakin, M. B., Laska, J. N., Takhar, D., Kelly, K. F., and Baraniuk, R. G., "The smashed filter for compressive classification and target recognition," International Society for Optics and Photonics Computational Imaging V 6498, 64980H (Jan. 2007) 12 pages.
Neifeld, M. A., Ashok, A., and Baheti, P. K., "Task-specific information for imaging system analysis," J. Opt. Soc. Am. A 24(12), B25-B41 (Dec. 2007).
Elad, M., "Optimized projections for compressed sensing," IEEE Transactions on Signal Processing 55(12), 5695-5702 (Dec. 2007).
Ashok, A., Baheti, P. K., and Neifeld, M. A., "Compressive imaging system design using task-specific information," Applied optics 47(25), 4457-4471 (Aug. 2008).
Calderbank, R., Jafarpour, S., and Schapire, R., "Compressed learning: Universal sparse dimensionality reduction and earning in the measurement domain," preprint, accessible via http://citeseerx.ist.psu.edu/viewdoc/download?doi=10.1.1.481.8129&rep=rep1&type=pdf (2009) 10 pages.
Duarte-Carvajalino, J. M. and Sapiro, G., "Learning to sense sparse signals: Simultaneous sensing matrix and sparsifying dictionary optimization," IEEE Transactions on Image Processing 18(7), 1395-1408 (Jul. 2009).
Xu, J., Pi, Y., and Cao, Z., "Optimized projection matrix for compressive sensing," EURASIP Journal on Advances in Signal Processing 2010(1), 560349 (2010) 8 pages.
Timofte, R. and Van Gool, L., "Sparse representation based projections," Proceedings of the 22nd British machine vision conference-BMVC , 61-1 (Jan. 2011) 12 pages.
Cirean, D., Meier, U., Masci, J., and Schmidhuber, J., "Multi-col. deep neural network for traffic sign classification," Neural Networks 32, 333-338 (2012). Selected Papers from IJCNN 2011.
Li, G., Zhu, Z., Yang, D., Chang, L., and Bai, H., "On projection matrix optimization for compressive sensing systems," EEE Transactions on Signal Processing 61(11), 2887-2898 (Jun. 2013).
Huval, B., Wang, T., Tandon, S., Kiske, J., Song, W., Pazhayampallil, J., Andriluka, M., Rajpurkar, P., Migimatsu, T., Cheng-Yue, R., Mujica, F., Coates, A., and Ng, A. Y., "An empirical evaluation of deep learning on highway driving," preprint, accessible via https://arxiv.org/abs/1504.01716 (Apr. 2015) 7 pages.
Levi, G. and Hassner, T., "Age and gender classification using convolutional neural networks," Proceedings of the IEEE Conference on Computer Vission and Pattern Recognition, 34-42, IEEE (Jun. 2015).
Xu, S., de Lamare, R. C., and Poor, H. V., "Distributed compressed estimation based on compressive sensing," IEEE Signal Processing Letters 22(9), 1311-1315 (Sep. 2015).
Romero, A., Gatta, C., and Camps-Valls, G., "Unsupervised deep feature extraction for remote sensing image classification," IEEE Transactions on Geoscience and Remote Sensing 54(3), 1349-1362 (Mar. 2016).
Lohit, S., Kulkarni, K., and Turaga, P., "Direct inference on compressive measurements using convolutional neural networks," IEEE International Conference on Image Processing (ICIP) , 1913-1917 (Aug. 2016).
Kumar, A., Kim, J., Lyndon, D., Fulham, M., and Feng, D., "An ensemble of fine-tuned convolutional neural networks for medical image classification," IEEE Journal of Biomedical and Health Informatics 21, Issue No. 1, 31-40 (Jan. 2017).
Maggiori, E., Tarabalka, Y., Charpiat, G., and Alliez, P., "Convolutional neural networks for large-scale remote-sensing mage classification," IEEE Transactions on Geoscience and Remote Sensing 55(2), 645-657 (Feb. 2017).
Birch, C., Woo, B., Dagel A., LaCasse, C., "Pseudo-random Prism Arrays for Lensless Computational Imagers", Optical Design and Fabrication 2017, OSA Technical Digest, Optical Society of America (Jul. 2017) 6 pages.
Vardasca, R., Vaz, L., and Mendes, J., "Classification and Decision Making of Medical Infrared Thermal Images", Classification in BioApps, Lecture Notes in Computational Vision and Biomechanics, vol. 26, 79-104, Springer International Publishing, Cham (2018).
Birch, G. C., Quach, T.-T., Galiardi, M., LaCasse, C. F., and Dagel, A. L., "Optical systems for task-specific compressive classification," SAND2018-8191C (Sep. 2018), 9 pages.
Birch, G., Quach, T., Galiardi, M., Lacass, C., and Dagel, A., Optical Systems for Task-Specific Compressive Classification, Proceedings SPIE Optics and Photonics for Information Processing XII, Sep. 2018, vol. 1075108, SPIE, Bellingham, WA, 10 pages.
Redman, B., Dagel, A., Kaehr, B., Lacasse, C., Birch, G., Quach T., and Galiardi, M., Task-Specific Computational Refractive Element Via Two-Photon Additive Manufacturing, Optical Design and Fabrication 2019 (Freeform, OFT), Jun. 2019, Optica Publishing Group, Washington, DC United States, 2 pages.
Redman, B., Birch, G., Lacasse, C., Dagel, A., Quach T., and Galiardi, M., Design and Evaluation of Task-Specific Compressive Optical Systems, Proceedings SPIE Computational Imaging IV, May 2019, vol. 10990, SPIE, Bellingham, WA, 13 pages.
Birch, G., Redman, B., Dagel, A., Kaehr, B., Dagel, D., Lacasse, C., Quach T., and Galiardi, M., Characterization of 3D Printed Computational Imaging Element for Use in Task-Specific Compressive Classification, Proceedings SPIE Optics and Photonics for Information Processing XIII, Sep. 2019, vol. 111360E, SPIE, Bellingham, WA, 12 pages.
Galiardi, M., Quach T., Birch G., Lacasse, C., and Dagel, A., Task-Specific Compressive Optical System Design Through Genetic Algorithms, International Conference on Numerical Electromagnetic and Multiphysics Modeling and Optimization, Boston, MA, May 29-31, 2019, Oct. 2019, 165-168, IEEE, Piscataway, NJ.
Redman, B., Calzada, D., Wingo, J., Quach, T., Galiardi, M., Dagel, A., Lacasse, C., and Birch, G., Optimizing a Compressive Imager for Machine Learning Tasks, Fifty-Third Asilomar Conference on Signals, Systems & Computers, Pacific Grove, CA, Nov. 3-6, 2019, Nov. 2019, 1000-1004, IEEE, Piscataway, NJ.
Redman, B., Dagel, A., Galiardi, M., Lacasse, C., Quach T., and Birch, G., Performance Evaluation of Two Optical Architectures for Task-Specific Compressive Classification, Optical Engineering, May 2020, vol. 59, Issue No. 5, 051404, SPIE, Bellingham, WA.

* cited by examiner

TASK-SPECIFIC SENSOR OPTICAL DESIGNS

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to optical designs for image classification or regression. The application relates more specifically to task-specific sensor optical designs and non-invertible information measurement via optical hardware.

Many optical systems are used for specific tasks such as classification or regression. Of these systems, the majority are designed to maximize image quality for human observers; however, machine learning classification algorithms do not require the same data representation used by humans.

Previous works have demonstrated classification tasks performed with high accuracy on compressed signals. Compressive sensing approaches have enabled the generation of optical systems that collect these lower-dimensional representations of data directly, while still enabling estimation of the originally sensed data. However, traditional compressive sensing does not utilize information about the performance of the ultimate task as a means of selecting the best measurements to be collected by a device. Previously it was shown that task-specific information enables optimizing a compressive measurement matrix to achieve better performance of a classification task than traditional compressed sensing methods.

Classification of images is an active area of research for fields such as self-driving cars, facial recognition, medical imaging and remote sensing. In these fields the optical systems perform a specific task, however the images are commonly optimized for a human observer. The classification of the images is performed using machine learning techniques which reduce the dimensionality of the data as part of the processing, therefore, a smaller subset of data may be recorded without loss of performance. Compressive sensing focuses on recording the minimum amount of information while still maintaining high performance for a task such as object detection or classification.

Research in compressive sensing has shown that images can be reconstructed from datasets sampled below the Shannon-Nyquist sampling limit. The ability to reconstruct the image indicates that the information is retained by the compressed images. It was shown that reconstruction of compressed images was not required for classification task performed using machine learning.

Compressive sensing uses a sensing matrix to reduce the dimensionality of a set of data. Typically the matrix is random with a Gaussian or uniform distribution, which for many applications are near optimal. However, work has been done to further optimize the matrices.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

BRIEF SUMMARY OF THE INVENTION

One embodiment discloses a method for designing a compressive sensing matrix for machine learning. The method includes receiving an image associated with a classification task; generating a sensing matrix, the sensing matrix comprising an array of nonzero elements of the image; providing a prism array comprising a plurality of prism elements, the prism array in communication with the sensing matrix; mapping a row of values corresponding with an input angle of the prism array to a respective column corresponding with a detector; detecting via the detector an output angle of a prism element of the prism array associated with a respective input angle; and fabricating a physical model of the detector; generating a compressed representation of the image via the physical model; applying a machine learning algorithm to the compressed representation of the image; and generating an optimized non-invertible final determination of the image.

Another embodiment discloses a prism array architecture for a classification task for reducing a dimensionality of an optical measurement and generating an optical component. The prism array architecture includes a sensing matrix. The sensing matrix maps values in object space to measurements in image space. The sensing matrix has columns representing a plurality of separated nonzero values. A prism array made of multiple prism elements is arranged to map a plurality of input angles to a single detector wherein each prism element maps an input angle to a corresponding output location. A transmission of the prism element corresponds to a weighting of the sensing matrix. A processor executes a machine learning algorithm applied to a compressed representation of the optical component to generate an optimized non-invertible final determination of the optical component.

Another embodiment discloses a non-transitory, computer-readable medium comprising instructions that, when executed by one or more processors, cause the one or more processors to perform the following operations: receiving an image associated with a classification task; generating a sensing matrix, the sensing matrix comprising an array of nonzero elements of the image; providing a prism array comprising a plurality of prism elements, the prism array in communication with the sensing matrix; mapping a row of values corresponding with an input angle of the prism array to a respective column corresponding with a detector; detecting via the detector an output angle of a prism element of the prism array associated with a respective input angle; and fabricating a physical model of the detector; generating a compressed representation of the image via the physical model; applying a machine learning algorithm to the compressed representation of the image; and generating an optimized non-invertible final determination of the image.

Another embodiment discloses a method for executing a neural network optimization modular architecture to optimize a sampling matrix realized in physical hardware. The method includes inputting an initial image-generating a noised image based on the initial image performing a Fourier Convolution to generate convoluted data corresponding to the noised image; applying a prism kernel or Fresnel blur to the convoluted data; generating a sensing matrix and alternately classifying the sensing matrix and processing the sensing matrix for invertibility.

Certain advantages of the embodiments described below include a method and system for constraining a sensing matrix to be physically realizable as a physical optical element.

Another advantage is a detailed simulation process which considers factors such as stray light, and presents a new optical architecture to compare to the prism array.

A further advantage of the disclosure is the design of optical architectures to realize optimized compressive sensing matrices. A first embodiment of an optical architecture provides compressive measurements through the use of an array of prisms and neutral density filters in a non-imaging design. Each prism and filter pair enable realizing one non-zero element within an optimized measurement matrix. Another embodiment of an optical architecture utilizes a more conventional approach, with a less complex prism array dividing the aperture into channels which are imaged onto an intermediate image plane. The sensing matrix weighting in the second architecture is achieved via a digital micromirror device (DMD) in the intermediate image plane. These alternate optical architectures realize the optimized measurement matrix.

Another advantage is compressive optical systems optimized for specific machine sensing tasks. Compressive optical architectures are disclosed. An array of prisms and neutral density filters is provided in which each prism and neutral density filter pair realizes one datum from an optimized compressive sensing matrix. An alternate optical architecture uses conventional optical components to image the aperture onto a detector, a prism array to divide the aperture, and a pixelated attenuation mask in an intermediate image plane.

Optical systems designs are disclosed that realize optimized measurement matrices for the MNIST task. These optical designs highly compress the data from the 784 pixels in the images to between one to nine measurements.

Fewer detector elements reduce constraints on physical placement, detector co-location, and pixel size. Both the images of a MNIST dataset and the sensing matrix are mathematical constructs which have to be translated to physical parameters to create an optical system. The object is assumed to be an object at an infinity, therefore, the light from each pixel is a collimated source, or plane wave. The images in the MNIST dataset are 28 by 28 pixels, so the optical systems were designed for 28 by 28 input angles. The sensing matrix may be applied as a mapping of input angles in object space to detector values in image space. Each row of the sensing matrix is one input angle, and the column determines the detector. For a nonnegative sensing matrix, the weighting can be normalized to correspond to the transmission from each input angle.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
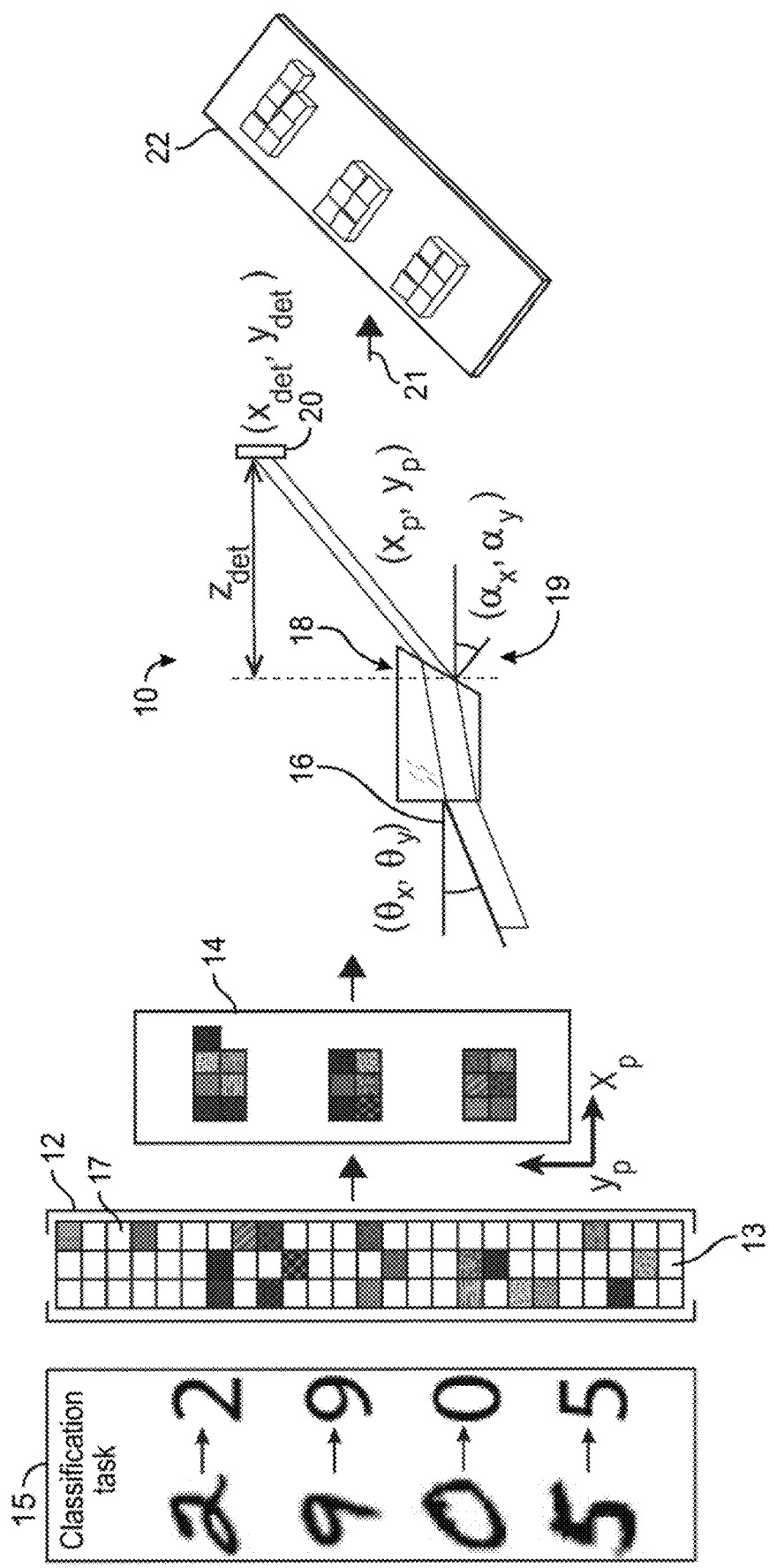
FIG. 1 shows an exemplary process flow diagram of prism array architecture.

Referring to FIG. 1, a process flow diagram 10 for an exemplary prism array architecture for task-specific compressive sensing is shown. A sensing matrix 12 is created in response to a classification task 15 to reduce the dimensionality of an optical measurement. For simplicity, the exemplary embodiment shown in FIG. 1, the classification task 15 is a column of numerical figures. Optical systems are configured to realize optimized measurement matrices for the MNIST task. These optical designs highly compress the data from 784 pixels in the images to between one and nine measurements. Having so few detector elements reduces constraints on physical placement, detector co-location, and pixel size. Other classification tasks may be more complex, such as video images.

An optical component 22, or physical model, is generated from the sensing matrix 12 by mapping the rows 17, corresponding with input angles 16 of the position prisms 14 to the columns 13 corresponding with detectors 20. The system response matrices are generated by the position prisms 14 and represent the optical component's sensitivity to input angles.

In a first exemplary embodiment shown a prism array architecture 10 includes the sensing matrix 12 that maps values in object space to measurements in image space. Each column 13 of sensing matrix 12 includes multiple separated nonzero values. Mapping multiple input angles to a single detector is implemented by an array of prism elements 18. Each prism is an element 18 that maps an input angle 16 to an output angle 19. Each prism element maps an input angle 16 to an output location 21. The transmission of the prism corresponds to a weighting of the sensing matrix 12. An exemplary process is described below to design a prism array to realize an arbitrary sensing matrix 12. The process workflow 10 is shown in FIG. 1.

The position of detectors 20 are pre-set because the prism elements 18 are clustered around detectors 20. The separation between detectors 20, and the distance between prism array 18 and the respective detector 20 determines the stray-light or crosstalk between the prism arrays. This channel crosstalk may be decreased by widening the separation between the detectors. Decreasing the distance between the prism array 18 and the detector 20 decreases the separation that is required of the detectors, but correspondingly increases the angle between the prisms 18 and the detector 20. In the exemplary embodiment of FIG. 1, the distance between the detectors 20 was set to 3 mm in both the x and y direction, and the distance between the prism array 18 and the detector 20 was set to 9 mm in the z direction.

After detector positions are set, each nonzero element in the sensing matrix 12 is assigned a position prism 14 or grid centered on the corresponding detector. The grid spacing is determined by the size of the prisms 18. The size of the prism 18 determines if the detector 20 is under-filled or over-filled, over the range of angles accepted by each prism 18. In one embodiment, the prism size may be, e.g., 200 µm by 200 µm, which overfills the detector for the designed field of view of each prism 18. Large prisms increase the power on the detector 20 at the expense of blurring the system response. Errors may be caused by the prism size relative to the detector size are discussed in more detail below.

The position of the prisms relative to the detector may be used by a sequential raytrace program to optimize the angle of each prism. The index of refraction of the prism material is approximately 1.5 for all relevant wavelengths.

The physical parameters of the prism array are used to generate a physical model 22 in a non-sequential raytracing program. Each prism is modeled as a separate rectangular solid. The weighting of the sensing matrix 12 is implemented with coating on the tilted surface of each prism. Transmissions are set to the weight of the normalized sensing matrix 12, and the reflectance is set to a uniform 6%. This embodiment approximates neutral density filters where the reflection is associated with the glass filter interface (not shown). Attenuation is associated with absorption inside the filter. The transmission values may be uniformly binned into 128 values between 0 and 1. Raytraces through the non-sequential model are used to create a system response matrix of the prism array 18.

Prism array 18 represents a physical realization of sensing matrix 12. First, each of the nonzero entries 17 from the sensing matrix 12 is assigned to a physical location as indicated by position prisms 14. Then the angles of each prism 14 are optimized to map the input angle 16, determined by the location in the sensing matrix 12, to the detector position. A physical model is then created from the prism geometry to allow for simulation of the optical system 10.

Figure 2:
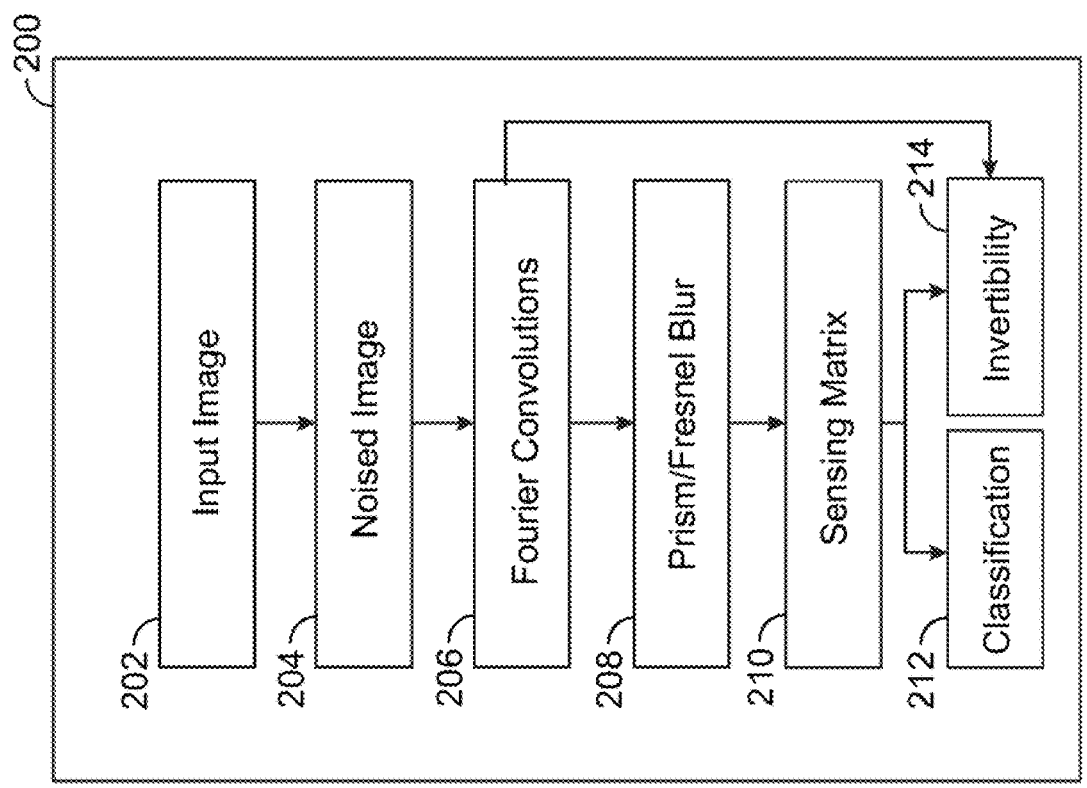
FIG. 2 shows an exemplary neural network optimization modular architecture.

Referring next to FIG. 2, an exemplary neural network optimization modular architecture 200 is shown. The neural network optimizes a sampling matrix which is then realized in physical hardware. Sensing matrix 12 may be optimized using deep learning, a machine learning technique that teaches computers to do what comes naturally to humans. A neural network with a high fidelity to the optical system may be used. An accurate and precise deep learning model of an optical arrangement enables the creation and tuning of the sensing matrix which closely recreate the expected results when transferred back to the optical system. The modular architecture 200 includes an initial input image at step 202. Next, a noised image is generated from the input images at step 204. The architecture proceeds at step 206 to perform Fourier Convolutions, as described in greater detail below with respect to blurring processes. Next, at step 208, a prism kernel or Fresnel blur is applied to the convoluted data from step 206. Following blurring of image data, the modular architecture 200 proceeds to step 210 to generate a sensing matrix 12. From step 210, sensing matrix 12 may be forwarded for classification at step 212, and/or for processing for invertibility at step 214. Blocks in the modular architecture 200 may be modified or removed without qualitatively affecting the subsequent steps, e.g., noised image step 204, sensing matrix step 210, or invertibility block and still have a valid architecture.

Blurring Kernels

Figures 5A, 5B, 5C:
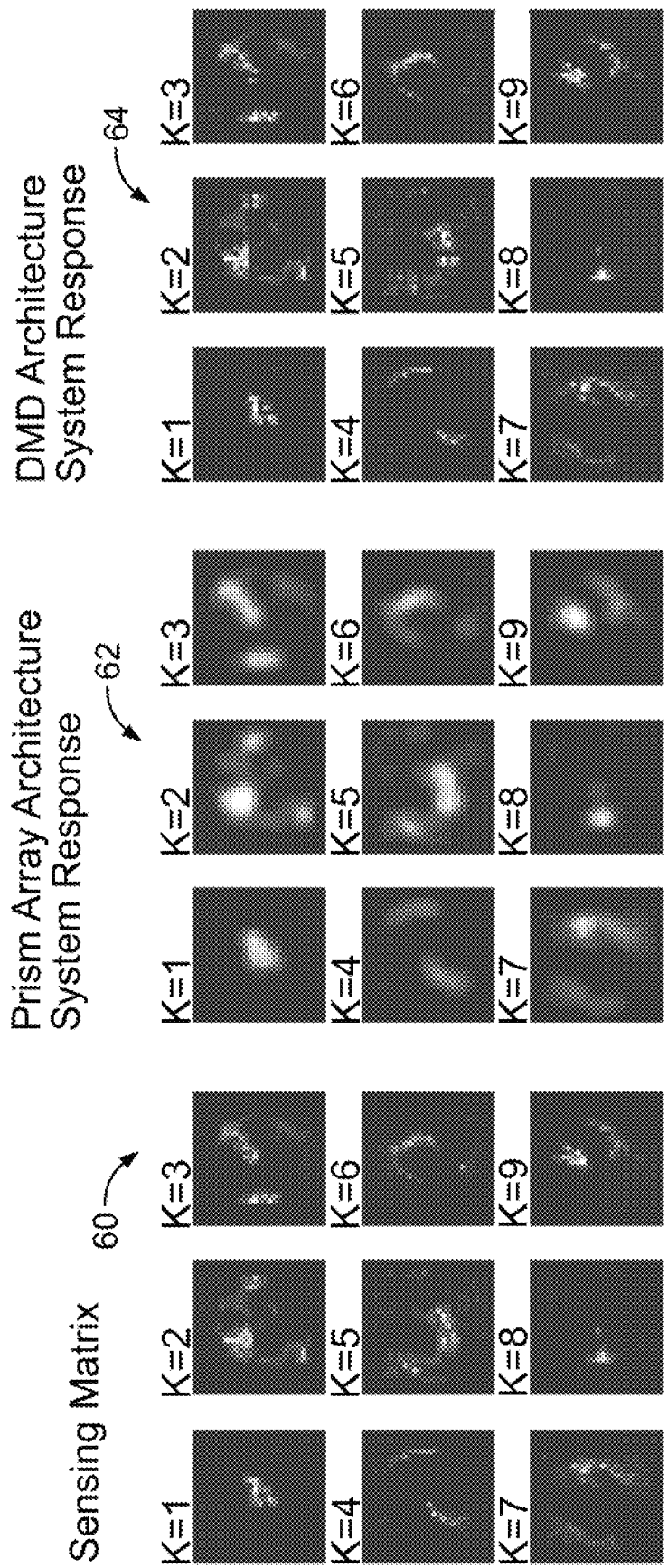
FIG. 5A shows a sensing matrix output array.
FIG. 5B shows a response to the sensing matrix output array for a prism array architecture system.
FIG. 5C shows a response to the sensing matrix output array for a DMD architecture system.

Sensing matrices implemented as prism arrays 18 may take into account the blurring that occurs in response to the size of the prisms, e.g., small prism elements will generate high diffraction and large prism elements will yield low resolution sensing matrices. Blurring appears as a convolution with the sensing weights $A \in R^{n \times n}$ and some blurring kernel B, $I_{final} = (A*B)I_{initial}$. In practice, this equates to $I_{final} = A(B*I_{initial})$, so that the image may be blurred before applying the compressive sensing matrix 12. Two blurring kernels may be used: a prism kernel and a Fresnel kernel. A Fresnel kernel accounts for diffraction. A hyperparameter search may be used to learn the prism width training many models with each prism size until an appropriate setting is determined. FIG. 5A shows an example sensing matrix 12 which is blurred based on one prism size with example hardware response (FIG. 5B) from a fabricated prism array 18.

Discrete Weights

In an embodiment, a continuous sensing matrix 12 may be replaced by a discrete sensing matrix. A neural network may learn a continuous sensing matrix, requiring the values to be discretized afterwards before being implemented in the optical system. Preferably optimization may be implemented directly with discrete values. Passing a gradient through a discrete weights layer is complex since the continuous weights may be non-differentiable.

The continuous sensing matrix 12 may be replaced by a Bayesian neural network, in which each weight is sampled from a categorical distribution $\{0, 0.1, \ldots, 1\}$ and the probabilities for each weight value are learned. The network may be optimized in two phases. In the first phase, the network is optimized using a Gaussian approximation for this distribution. Gaussian approximation the mean and variance of the categorical distribution are found. Both the mean and variance are differentiable. By freezing the sensing layer and using the categorical distributions instead of their approximations, the subsequent layers of the network may be accurately tuned.

The same process may be advantageously applied to train a sensing matrix of binary weights $\{0, 1\}$ with comparable classification accuracy. Another advantage is that L0 regularization may be employed, which is normally non-differentiable and thus unlearnable. With the Bayesian approach, the expectation of the L0 norm of the matrix using the probability values is regularized, to obtain improved sparsity models.

Blurring Kernel Simulation

In another embodiment, a blurring kernel method requires less computationally intense simulation and enables results with greater accuracy. A convolution between the center angle of each prism 18 and a blurring kernel representing the way in which the prism, or detector, geometry affects angular sensitivity is a much less computationally intense method to simulate the prism array. The blurring kernel may be created as a separate convolution between the active area of the detector and the irradiance profile on the detector plane.

In an embodiment, a polychromatic blurring kernel may be programmatically simulated using Fresnel diffraction and to simulate the effects of small prism sizes to very large prism sizes. Optimization using the geometric blurring kernel indicates that decreasing prism size improves performance because the blurring decreases with prism size. Measurements of physical prism arrays indicate that prism arrays including 30 µm prisms has more blurring than prism arrays with 80 µm prisms. This was because the small prism sizes resulted in diffraction dominating over refraction for determining the irradiance pattern across the detector plane. Fresnel diffraction is capable of modelling a relatively wide range of prism sizes.

Sensitivity Weighting

Multiple prisms for each non-zero element of the sensing matrix may be used to vary the weights. The sensing matrix may be binned into a set of discrete weights, and the smallest non-zero weight assigned a value of one. A weight that is twice as large as the smallest weight is assigned a value of two, etc. Prisms are added to the prism array based on the assigned value of the sensing matrix. This sensitivity weighting method increases the number of prisms in the prism array, but enables variable weights across a scene. The increase in prism count is offset by use of an L1 or L0 penalty to sparsify when optimizing the sensing matrix.

Masking

A technique for blocking stray light is described below. A blank in the shape of the prism array is printed onto the substrate. Aluminum is then sputtered across the substrate. The blank is then removed. An optically clear window in the shape of the prism array is formed, and the prism array is then printed.

Creating apertures for the optical component are difficult due to the small dimensions of the prism array 18. A buffer region may be created with prisms which refract the light away from the optical system. An aluminum aperture is then used that aligns to the prism array 18 to block out the rest of the clear substrate. The buffer region performs the function, although is more complex, and introduces more light than a sputtering masking technique. In an alternate embodiment, prism array 18 may be reflective, rather than refractive, and still achieve the same outputs as described herein.

For the sputtering masking technique, a layer of metal is deposited across the substrate with a clear aperture that is perfectly sized for the prism array. A shell and scaffold design is used followed by UV spot curing of the entire structure (approx. 5 W/cm² for 5 mins) to speed fabrication of the mask. Next a metal film is sputtered to render an opaque surface that is chemically resistant to the downstream photoresist development process. A 100 nm thick aluminum film provides uniform low transmittance over a broad range of wavelengths (i.e., from about 350 nm to about 1100 nm). The monolithic mask is then removed to yield a transparent window.

For a relatively large area, such as elements greater than 1 mm², shrinkage of block monolithic masks may be exacerbated, leading to poor edge quality. A thin conformal mask fabricated with a pull-tab provides a finer edge fidelity of the window and reduces array edge defects incurring from laser heating via prism overlap of ill-defined metal edges.

Figure 3:
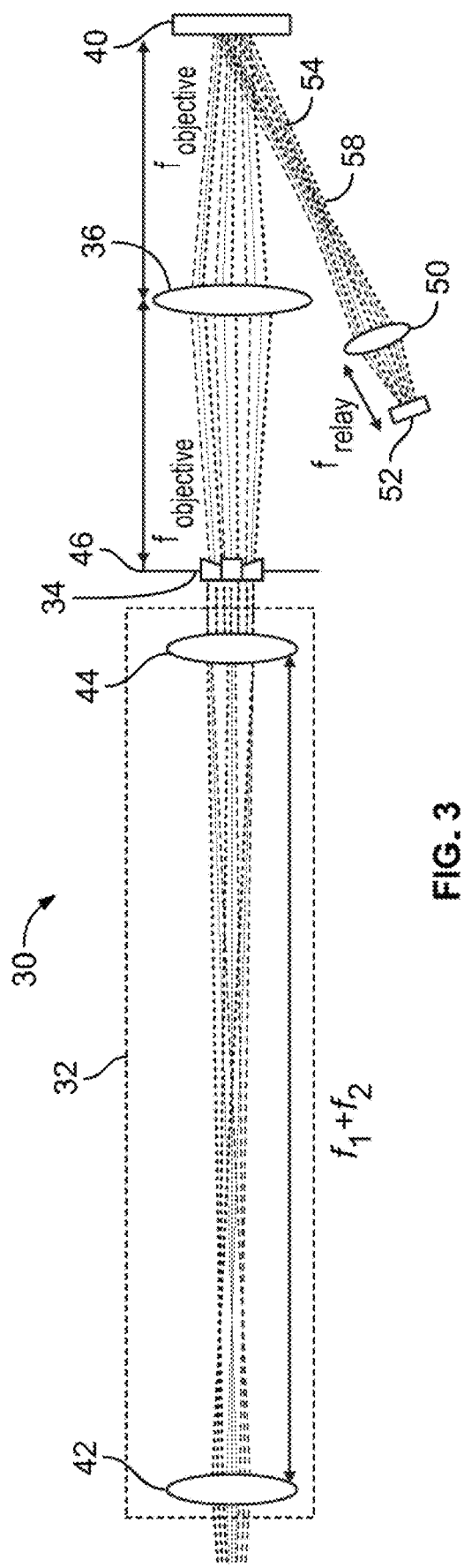
FIG. 3 shows an exemplary process flow diagram of a digital micromirror device architecture.
Figure 4:
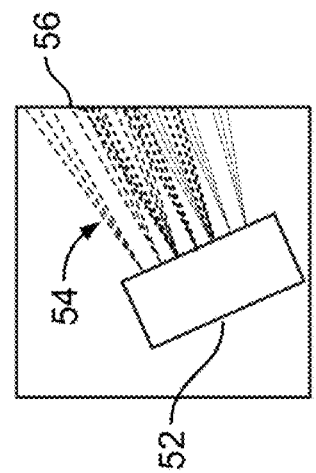
FIG. 4 is an enlarged view of the detectors showing channel separation.

Referring next to FIG. 3, a digital micromirror device architecture 30 is shown. In FIG. 3, an alternate architecture employs a digital micromirror device (DMD) 40, with a prism array 34. This architecture may be implemented with commercially available optical elements, and basic customized optical components. The DMD architecture 30 employs parallel optical channels $f_1$-$f_2$ for simultaneous measurements. DMD architecture 30 employs a prism array 34 to divide the aperture, or stop 46. An object (not shown) is imaged onto DMD 40 and the stop is imaged onto the detector 52. Stop 46 and fields $f_1$+$f_2$ are separated at DMD 40. Fields $f_1$-$f_2$ are combined to be overlapping at the detector, but the channels are separated.

Parallel measurements require a channel for each detector which was spatially resolved at DMD 40 plane, but uniform irradiance at the detector plane. An objective lens 36 disposed between stop 46 and DMD 40 images the object onto DMD 40 plane and a relay lens 50 receives the image from DMD 40 to image the stop 46 onto detector 52. The stop 46 is imaged onto detector 52 with the irradiance in the stop 46 assumed to be uniform. Stop 46 is disposed at the front focal point of the objective lens 36 so that the system is telecentric, thus allowing the distance between DMD 40 and relay lens 50 to vary without any variation of magnification.

Separate channels 54 are formed by prism array 34 to divide the stop 46. The angle of the prism array 34 set the separation between channels 54 in the intermediate image plane. Only one prism is required for each detector, and the size of the prisms 34 may be fabricated as separate components using polishing techniques.

In the exemplary embodiment, parameters are optimized using paraxial optics as a proof of concept for system 30. In an exemplary embodiment, DMD 40 determines the requirements of the remaining system components. In one exemplary embodiment, DMD 40 may be a DLP LightCrafter™ Model 6500 manufactured by Texas Instruments, or similar component having a large active area, e.g., 14.52 millimeters (mm) by 8.16 mm. A DMD may have 1920 by 1080 micromirrors across the active area, therefore the resolution of DMD 40 is much greater than 28 by 28 pixels minimum required for each channel 54. The channels on DMD 40 are arranged in a 3 by 3 grid, with the maximum size of each channel at DMD 40 plane equal to 2.72 mm by 2.72 mm. The light incident on objective lens 36 is collimated and imaged onto DMD 40, one focal length behind the objective lens. The width of each channel, $w_{channel}$, at DMD 40 is defined in Equation 1:

$$w_{channel} = 2 \tan(\text{HFOV}) f_{objective}, \quad \text{(Eq. 1)}$$

HFOV is the half field of view and $f_{objective}$ is the focal length of the objective lens. In one exemplary embodiment, a five degree) (5° HFOV design constraint requires the objective focal length $f_{objective}$ to be less than 13.0 mm. In the exemplary embodiment using MNIST as the image, there are 28×28 input angles, although the invention is not limited to any specific array of input angles. The input pixel size can be arbitrary, and the disclosed techniques are applicable, and the size of the prism array may be modified to accommodate various pixel sizes.

A Keplerian telescope 32 at the front end of system 30 is used to maintain 5° HFOV in object space and decreases the HFOV received by objective lens 36. In the exemplary system 30, HFOV magnification of 4 was selected, thus the HFOV received by the objective lens is 1.25° mm. The focal length is correspondingly reduced to 50 mm and the size of the channels are reduced at DMD 40 plane. The resulting region around each channel 54 reduces the likelihood of channel crosstalk. With the focal length of the objective lens 36 set at 50 mm, the angle of the prism may be optimized to −5.85° for a 2.58 mm separation between the channels at DMD 40. The separation of less than 2.72 mm increases the unused pixels around the outside edge.

The beam 54 for each channel 56 is narrowest at DMD 40. After that, each beam 54 expands but the centers of the beams cross. The centers of the converging beams create a point where the total beam diameter is narrowest. The location and diameter where the narrowest beam diameter may be determined by a combination of the field of view, prism angle, and objective lens focal length. In this design, relay lens 50 is located farther from DMD 40 than the minimum beam diameter since the minimum beam diameter 58 is very close to objective lens 36 as shown in FIG. 3. The close proximity of the two lenses may not provide adequate spacing for mounting hardware.

The focal length of the relay lens was set to 5 mm to give a 10 times magnification of the detector area. The larger the magnification, the larger effective detector area at the stop 46 and therefore a greater throughput. However, the entrance pupil of the relay lens needed to be larger than the beam diameter therefore decreasing the focal length required a faster lens. Additionally, increasing the effective area of the detector requires a larger prism size or the prism will under fill the detector. Increasing the prism size also increases the beam diameter. For this work, the prisms were set to 4 mm by 4 mm which required a relay lens entrance pupil diameter of 11.7 mm, requiring an F/0.43 lens which is not feasible. However, if the size of the prisms was reduced to 1 mm by 1 mm (the effective size of the detector at the prism plane), the beam diameter at the relay lens was 3.59 mm requiring a F/1.39 lens, which is a commercially off the shelf option. The relay lens imaged the stop 46 onto the detectors. The detectors for this design were located in a 3 by 3 grid at the rear focal length of the relay lens with no separation between the detectors. For the cases of using fewer than nine detectors, the unused sections of DMD 40 would be set to no transmission.

FIGS. 5A, 5B and 5C show side-by-side comparisons between the system response matrices for a nine detector 52 configuration. FIG. 5A shows an ideal system response matrix 60. FIG. 5B shows the response matrix 62 for the prism array architecture 10 in response to the ideal system response matrix. FIG. 5C shows the response matrix 64 for the digital micromirror device (DMD) architecture 30.

The simulated system response matrices 60, 62, 64 were acquired from raytrace simulations which compress the images from the MNIST dataset. A classifier—e.g., a random-forest classifier, was retrained on the data. The retrained classifier was then used to classify a compressed test dataset, and the classification accuracy was recorded. The training and classifying was repeated for ten randomized datasets to determine the classification accuracy mean and variance. The accuracy of the compressive sensing systems was compared to the classification accuracy when the sensing matrix 12 was used to compress the data.

Figure 6:
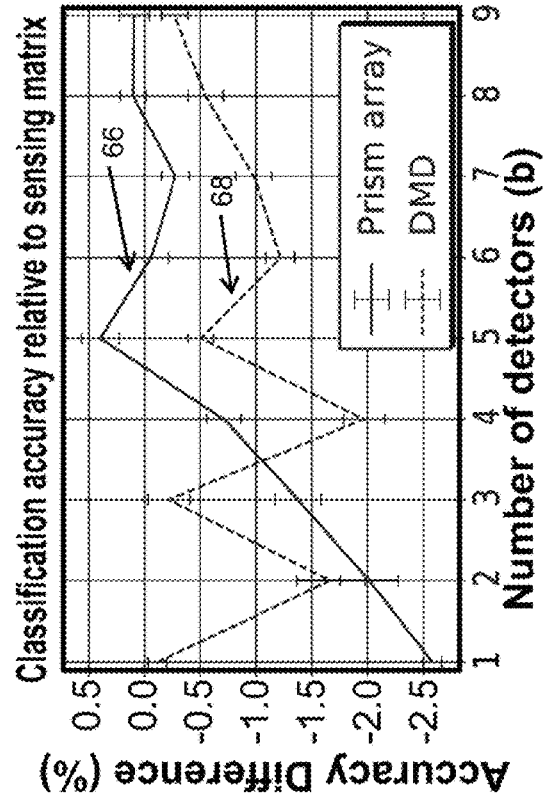
FIG. 6 is a graph representing classification of a MNIST Dataset for exemplary DMD, Prism and sensing matrix 12.
Figure 7:
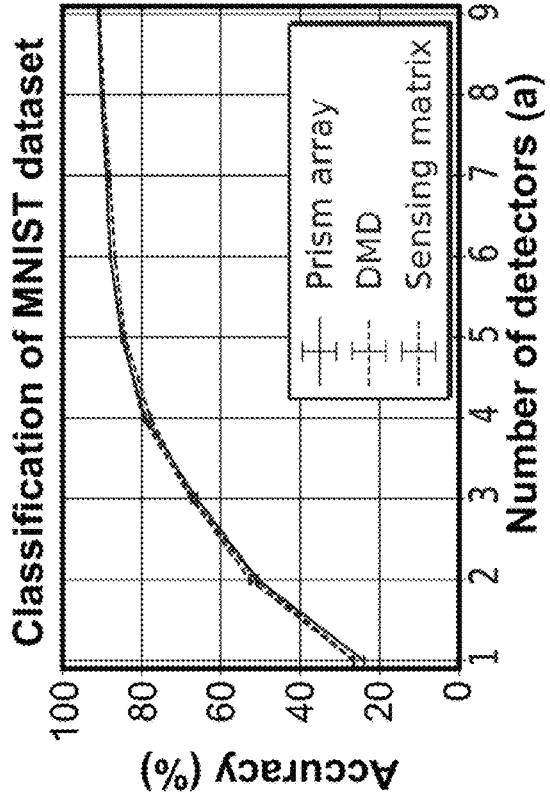
FIG. 7 is a graph representing classification of an exemplary prism array and a DMD array for a sensing matrix 12.

FIGS. 6 and 7 show the classification accuracy over a range of one to nine detectors. FIG. 6 is a graph of classification of an MNIST dataset showing percent (%) accuracy for discrete numbers of detectors. The error bars are set by the variance from ten training classification cycles. Both optical systems 10, 30 had very similar performance to the ideal sensing matrix 12, converging to over 90% accuracy using nine detectors. FIG. 7 is a graph showing accuracy difference of less than 3% for all the detectors. The performance difference between the ideal sensing matrix 12 and system response matrices for the prism array, indicated by line 66 and the system response matrices for the DMD system, indicated by line 68, showed the prism array having improved performance over the ideal sensing matrix 12 when a five, eight, or nine detector configuration are used. The prism array 10 had significant blurring as seen in FIG. 5 (*b*). Blurring may release some of the sparse constraint, allowing for improved performance without increasing the number of prism elements, and indicating an improvement over classical design techniques for optimizing the compressive sensing systems.

Figure 8:
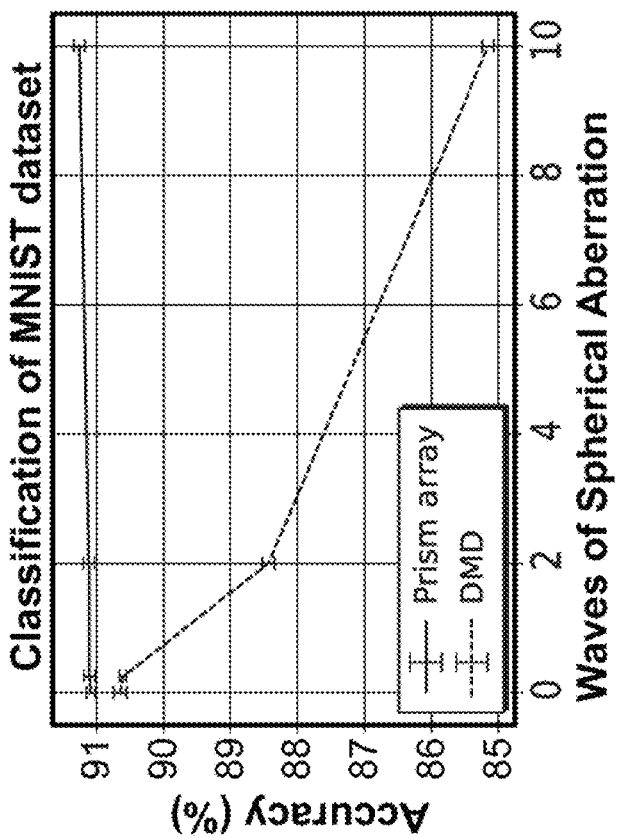
FIG. 8 is a graph representing classification of an exemplary prism array and a DMD array for an MNIST Dataset.

Referring next to FIG. 8, a graph representing classification of an exemplary prism array and a DMD array for an MNIST Dataset is shown. As indicated by the graph, prism array classification accuracy is maintained relatively constant above 91% over the range of waves of spherical aberration. For the DMD prism array architecture, the classification accuracy declines almost linearly, from slightly less than 91% to about 85% over same range, with the steepest decline at the low end of the range, between 0 and 2 waves of spherical aberration.

Figure 9:
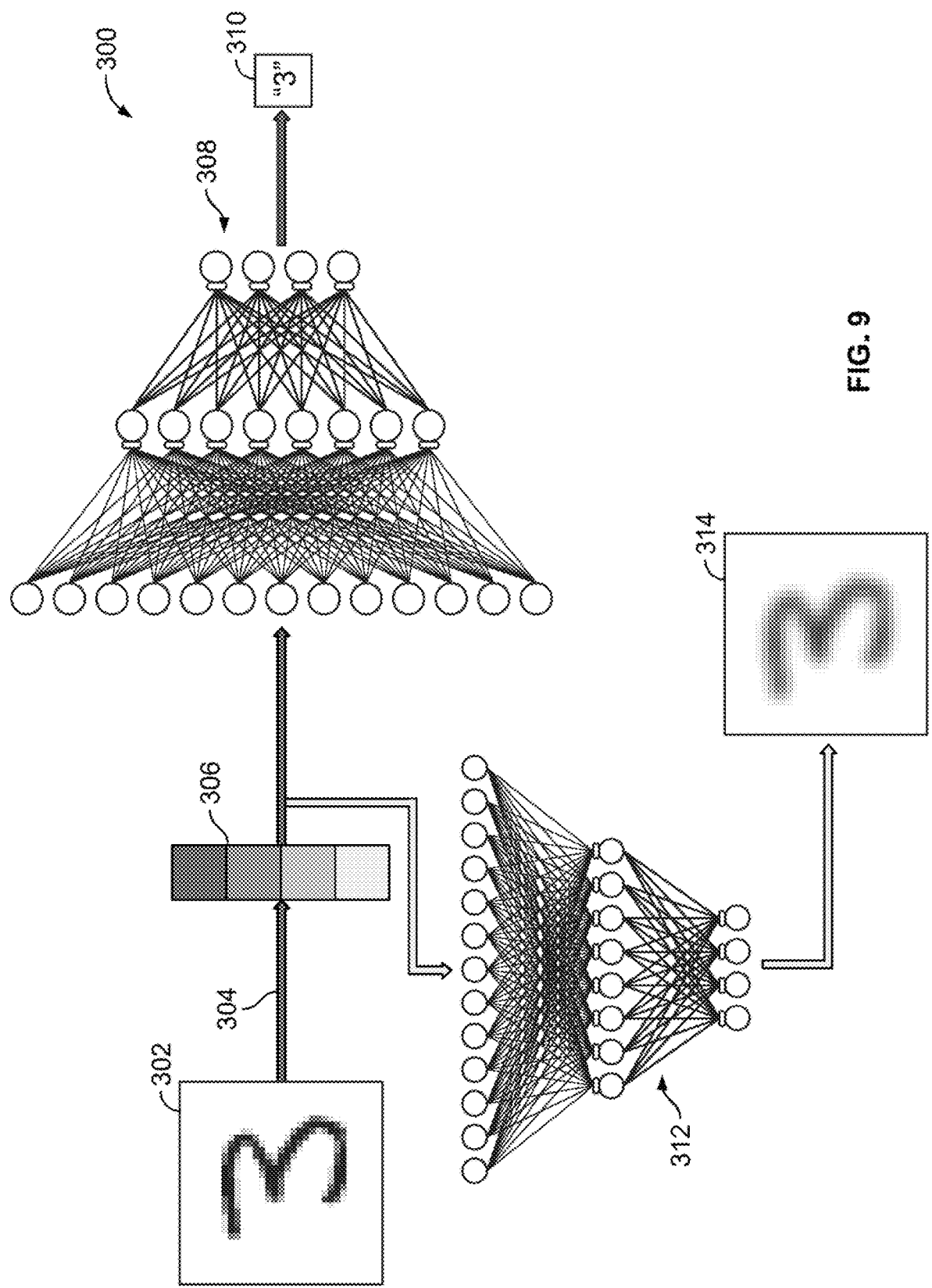
FIG. 9 is a schematic process diagram of a non-invertible compressed representation with a second neural network to reconstruct the original image from the compressed representation.

Referring next to FIG. 9, process diagram of a non-invertible compressed representation classification network 300 is shown. An original image, or scene, 302 is compressed via compressive sensing, indicated by arrow 304, and the compressed scene is generated as a compressive representation 306. The compressed representation 306 is input to a first neural network, or compression network 308 for original classification of the compressed data, and the output of first neural network 308 is classified at the output 310 as a final determination.

Compressed representation 306 is also input to a second neural network, or invertibility network 312. Classification network 300 is a method for measuring, and thus minimizing, the reconstructability of an image from the compressed representation 306. The Nash Equilibrium is achieved when even the best invertibility network still yields low-quality results. Formally, consider C to be the compression network 308 with parameters $\theta_c$, I to be the invertibility network 312 with parameters $\theta_I$, $x_i$ to be a flattened image, and $c_i$ the compressed representation 306 of image 302. Then $\theta_c$ is calculated by Eq. 2 as follows:

$$\theta_c = \mathrm{argmax}_{\theta_c} \min_{\theta_I}[\mathrm{Loss}(I(c_i;\theta_I)) - \mathrm{Loss}(C(X_i;\theta_c))] \qquad (\text{Eq. 2})$$

The loss of the compression network is the same in all cases, with freedom to design different invertibility tasks and loss functions.

In FIG. 9, the original image 302 is reconstructed from compressed representation 306. Compressed representation 306 is input to invertibility network 312 to generate inverted image 314 An ideal non-invertible model would only contain the information necessary to infer the class of the image but nothing of the shape or position of the digit. In this approach, mean squared error (MSE) is used as the loss function in Eq. 2 above, i.e.:

$$\mathrm{Loss}(I(c_i;\theta_I))) = [x_i - I(c_i;\theta_i)]^2 \qquad (\text{Eq. 3})$$

A second neural network was trained to reconstruct the original image given the compressed representation. In one example, a training procedure similar to that of Generative Adversarial Networks (GANs) may be used. In the exemplary embodiment, training alternates between compression network 308 to compressively classify the images and invertibility network 312. Compression network 308 is then given an additional loss term for the invertibility of the compressed representation according to invertibility network 312.

The compressive network 300 limits the amount of information passed through the compression mechanism that is unnecessary for classification while retaining as much information as possible related to the classification task. This approach may be implemented using both the original pixel data and the two-dimensional discrete Fourier transform (DFT) of the image. Both representations may be implemented in optical hardware described above, e.g., prism array 18. With respect to non-invertibility, the goal is to minimize the ability to reconstruct the input image from the compressed representation.

Compressive Analytics on Optimally Compressed Signals

Figure 10:
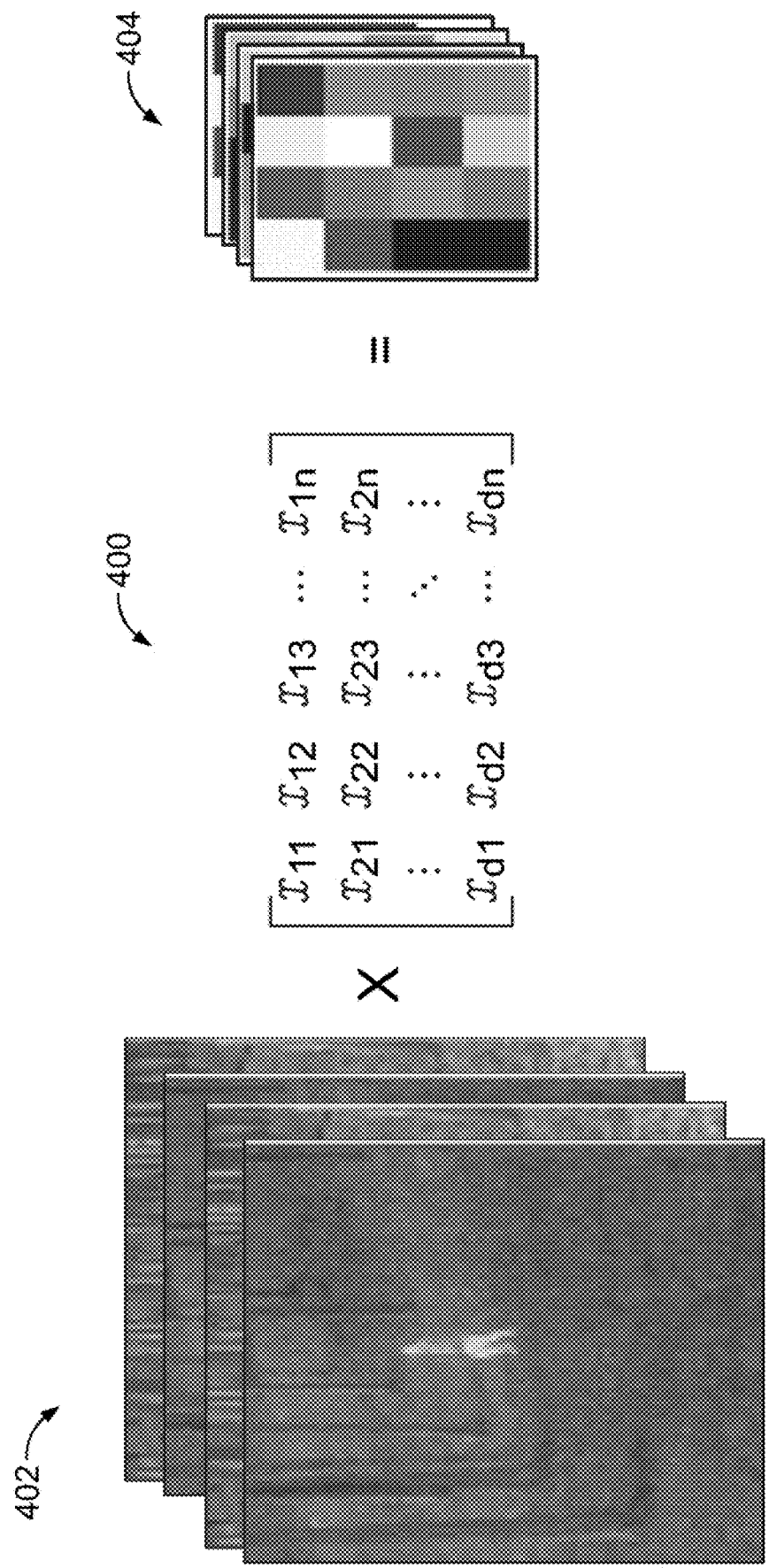
FIG. 10 is an exemplary application of an optical measurement matrix for optimization of machine learning classification.

Referring next to FIG. 10, an exemplary application of an optical measurement matrix 400 for optimization of machine learning classification is shown. Compressive classification allows signal recognition from a small set of projections, thus leading to minimized bandwidth and maximized machine assessment. Prior knowledge of targets of interest to find the sparsest representation of data that yields the highest classification accuracy. Critically, compressive classification does not attempt to reconstruct the signal for human interpretation, but rather optimizes the signal for maximized machines assessment accuracy. Prior techniques focus on random measurement matrices as a generally good measurement matrix to sparsify a broad class of signals. However, using strong a priori knowledge of specific targets of interest an optimized measurement matrix 400 is generated.

In the exemplary embodiment of FIG. 10, a series of images 402, e.g., in the embodiment show, images of a man walking near a fence, representing an unparsified input signal, is crossed with optimized measurement matrix 400, to generate a parsified output signal 404.

According to Nyquist sampling theorem, in order to not lose information when uniformly sampling a signal, the sampling must be performed at least twice the bandwidth of the sampled signal. Compressive classification often samples significantly below the Nyquist rate. Consider Eq. 4 below:

$$\min_x Ax = b \qquad \text{Eq. 4}$$

where A is the unsparsified input signal 402, x is the optimized measurement matrix 400, and b is the sparse output signal 404. An optimal measurement matrix 400 is calculated such that the dimensionality of b is as small as possible, while still capable of accurately classifying the unparsified input signal 402. The merit function min Ax, in Eq. 34, is the classification accuracy and the goal of the optimization is to maximize sparsity while minimizing classification error. For example, the images of someone walking up to a fence, the unsparsified signal 402, since the type of input signal is known, which is detected, the measurement matrix 400 is optimized by running a genetic algorithm, or other global optimization algorithm, to find the smallest dimensionality that still allows a machine learning classification algorithm (e.g., Support Vector Machines (SVM), k-Nearest Neighbor (kNN) algorithm, Random Forests, Convolutional Neural Networks (CNNs) or Bayesian neural networks) to accurately classify the sparsified output signal 404.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the task-specific sensor optical design methods and systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for designing a compressive sensing matrix for machine learning, comprising:
   receiving an image associated with a classification task;
   generating a sensing matrix, the sensing matrix comprising an array of nonzero elements of the image;
   providing a prism array comprising a plurality of prism elements, the prism array in communication with the sensing matrix;
   mapping a row of values corresponding with an input angle of the prism array to a respective column corresponding with a detector;
   detecting via the detector an output angle of a prism element of the prism array associated with a respective input angle;
   fabricating a physical model of the detector;
   generating a compressed representation of the image via the physical model;
   applying a machine learning classification algorithm to the compressed representation of the image; and
   generating an optimized non-invertible final determination of the image.

2. The method of claim 1, further comprising: implementing the machine learning classification algorithm by applying at least one blurring kernel.

3. The method of claim 2, wherein the at least one blurring kernel comprises a prism kernel and a Fresnel kernel.

4. The method of claim 1, wherein the machine learning classification algorithm comprises a Bayesian neural network, the Bayesian neural network comprises a plurality of weights in which each weight of the plurality of weights is sampled from a categorical distribution and a probability for each weight is learned.

5. The method of claim 4, further comprising:
   optimizing the Bayesian neural network in a first phases using a Gaussian approximation for the categorical distribution; and
   freezing a sensing layer and using the categorical distributions to tune a subsequent layer of the Bayesian neural network;
   wherein the sensing matrix comprises a discrete sensing matrix.

6. The method of claim 5, further comprising simulating a polychromatic blurring kernel programmatically using Fresnel diffraction.

7. The method of claim 4, further comprising providing a plurality of prism elements for each non-zero element of the sensing matrix to vary the associated weights.

8. The method of claim 7, further comprising assigning the smallest non-zero weight a weight value of one and sequentially assigning the weight value in corresponding multiples of the smallest non-zero weight value;
   adding prism elements to the prism array based on the assigned weight value of the sensing matrix; and
   using a penalty to sparsify when optimizing the sensing matrix and enabling variable weight values across a scene;
   wherein the sensing matrix being binned into a plurality of discrete weights.

9. The method of claim 8, wherein the penalty comprises an L1 penalty or an approximate L0 norm penalty.

10. A prism array architecture for a classification task for reducing a dimensionality of an optical measurement and generating an optical component, comprising:
    a sensing matrix configured to map values in object space to measurements in image space; wherein the sensing matrix having one or more columns representing a plurality of separated nonzero values;
    a prism array comprising a plurality of prism elements arranged to map a plurality of input angles to a single detector wherein each prism element maps an input angle to a corresponding output location;
    wherein a transmission of the prism array corresponds to a weighting of the sensing matrix; and
    a processor configured to execute a machine learning classification algorithm applied to a compressed representation of the optical component to generate an optimized non-invertible final determination of the optical component.

11. The prism array architecture of claim 10, further comprising;
    optimizing the respective angle of each prism element of the prism array by a sequential raytrace program to position the prism element relative to the detector to optimize the angle of the prism element.

12. The prism array architecture of claim 10, wherein the respective prism elements having an index of refraction of approximately 1.5 for all relevant wavelengths.

13. The prism array architecture of claim 10, further comprising a digital micromirror device (DMD); the prism array configured to divide a stop; wherein an object is imaged onto the DMD and the stop is imaged onto the detector; and wherein the stop and a field of view are separated at the DMD; the field of view overlapping at the detector, and a channel corresponding with each detector is separated; the channels formed by dividing an aperture using the prism array.

14. The prism array architecture of claim 10, wherein the processor is configured to apply at least one blurring kernel.

15. The prism array architecture of claim 14, wherein the at least one blurring kernel comprises a prism kernel, and a Fresnel kernel.

16. The prism array architecture of claim 15, wherein the sensing matrix is binned into a plurality of discrete weights.

17. The prism array architecture of claim 15, wherein the processor is further configured to assign a smallest non-zero weight a weight value of one and sequentially assigning a weight value in corresponding multiples of the smallest non-zero weight value;
    add prism elements to the prism array based on the assigned weight value of the sensing matrix; and
    sparsify when optimizing the sensing matrix and enabling variable weight values across a scene by applying an L1 penalty.

18. The prism array architecture of claim 10, wherein the machine learning classification algorithm comprises a Bayesian neural network, the Bayesian neural network comprising a plurality of weights in which each weight of the plurality of weights is sampled from a categorical distribution and a probability for each weight is learned.

19. The prism array architecture of claim 10, wherein the sensing matrix comprises a discrete sensing matrix wherein the Bayesian neural network is arranged in a first phases using a Gaussian approximation for the categorical distribution; and
    the sensing layer uses the categorical distributions to tune a subsequent layer of the machine learning classification algorithm.

20. A non-transitory, computer-readable medium comprising instructions that, when executed by one or more processors, cause the one or more processors to perform operations comprising:
- receiving an image associated with a classification task;
- generating a sensing matrix, the sensing matrix comprising an array of nonzero elements of the image;
- providing a prism array comprising a plurality of prism elements, the prism array in communication with the sensing matrix;
- mapping a row of values corresponding with an input angle of the prism array to a respective column corresponding with a detector;
- detecting via the detector an output angle of a prism element of the prism array associated with a respective input angle;
- fabricating a physical model of the detector;
- generating a compressed representation of the image via the physical model;
- applying a machine learning classification algorithm to the compressed representation of the image; and
- generating an optimized non-invertible final determination of the image.

21. The non-transitory, computer-readable medium of claim 20, further comprising: implementing the machine learning classification algorithm by applying at least one blurring kernel.

22. The non-transitory, computer-readable medium of claim 21, wherein the at least one blurring kernel comprises a prism kernel, and a Fresnel kernel.

23. The non-transitory, computer-readable medium of claim 22, wherein the machine learning classification algorithm comprises a Bayesian neural network, the Bayesian neural network comprises a plurality of weights in which each weight of the plurality of weights is sampled from a categorical distribution and a probability for each weight is learned.

24. The non-transitory, computer-readable medium of claim 23, further comprising instructions for:
- optimizing the Bayesian neural network in a first phases using a Gaussian approximation for the categorical distribution; and
- freezing a sensing layer and using the categorical distributions to tune a subsequent layer of the machine learning classification algorithm;
- wherein the sensing matrix comprises a discrete sensing matrix.

25. The non-transitory, computer-readable medium of claim 24, further comprising instructions for simulating a polychromatic blurring kernel programmatically using Fresnel diffraction.

26. The non-transitory, computer-readable medium of claim 24, further comprising instructions for assigning the smallest non-zero weight a weight value of one and sequentially assigning a weight value in corresponding multiples of the smallest non-zero weight value;
- adding prism elements to the prism array based on the assigned weight value of the sensing matrix; and
- using an L1 penalty to sparsify when optimizing the sensing matrix and enabling variable weight values across a scene;
- wherein the sensing matrix being binned into a plurality of discrete weights.

* * * * *